United States Patent

Yamamoto et al.

[11] Patent Number: 5,127,487
[45] Date of Patent: * Jul. 7, 1992

[54] SYSTEM AND METHOD FOR AUTOMATICALLY CONTROLLING A VEHICLE SPEED TO A DESIRED CRUISE SPEED WITH A RELEASE FUNCTION

[75] Inventors: Isao Yamamoto; Hiroshi Inoue; Kazuyuki Mori; Kouichi Suzuki; Kinichiro Nakano; Hiroyuki Nomura; Kiyoshi Yoshida; Yoshiyuki Etoh, all of Kanagawa, Japan

[73] Assignee: Nissan Motor Company, Limited, Japan

[*] Notice: The portion of the term of this patent subsequent to Aug. 13, 2008 has been disclaimed.

[21] Appl. No.: 263,783

[22] Filed: Oct. 27, 1988

[30] Foreign Application Priority Data

Nov. 6, 1987 [JP] Japan .................. 62-279133

[51] Int. Cl.⁵ .............................. B60K 31/04
[52] U.S. Cl. .................. 180/179; 364/426.04; 123/352
[58] Field of Search ............. 180/178, 179, 175, 176, 180/177; 364/426.04; 123/352, 350, 349

[56] References Cited

U.S. PATENT DOCUMENTS

| | | | |
|---|---|---|---|
| 3,635,306 | 1/1972 | Davis | 318/5 |
| 4,336,566 | 6/1982 | Noddings et al. | 180/178 |
| 4,539,642 | 3/1985 | Mizuno et al. | 364/426 |
| 4,646,861 | 3/1987 | Kawata et al. | 180/179 |
| 4,829,437 | 5/1989 | Suzuki et al. | 364/426.04 |
| 4,829,438 | 5/1989 | Etoh | 364/426.04 |
| 4,835,696 | 5/1989 | Suzuki et al. | 364/426.04 |
| 4,908,764 | 3/1990 | Etoh | 364/426.04 |
| 4,922,428 | 5/1990 | Takahashi | 364/426.04 |

FOREIGN PATENT DOCUMENTS

| | | |
|---|---|---|
| 0074297 | 3/1983 | European Pat. Off. |
| 0145374 | 6/1985 | European Pat. Off. |
| 0171287 | 2/1986 | European Pat. Off. |
| 2309365 | 11/1976 | France |
| 59-58134 | 4/1984 | Japan |

Primary Examiner—Andres Kashnikow
Assistant Examiner—Richard Camby
Attorney, Agent, or Firm—Lowe, Price, LeBlanc & Becker

[57] ABSTRACT

A system and method for automatically controlling a vehicle speed to a desired cruise speed are disclosed in which in addition to a control unit and a throttle actuator through which an opening angle of an engine throttle valve is adjusted so that the vehicle speed detected by a vehicle speed sensor coincides with a target cruise speed set by a vehicle driver through a set switch, a vehicle speed determining circuit is provided for determining whether the vehicle speed detected by the vehicle speed sensor exceeds a lowest speed limit above which the cruse control by the control unit and throttle actuator becomes effective. When the vehicle speed is below the lowest speed limit, the power supply to the throttle actuator is interrupted so that the cruise control by means of the throttle actuator is cancelled.

7 Claims, 3 Drawing Sheets

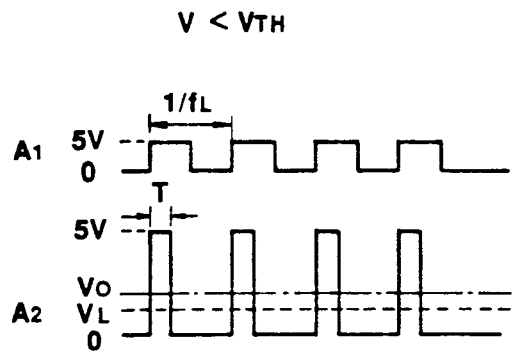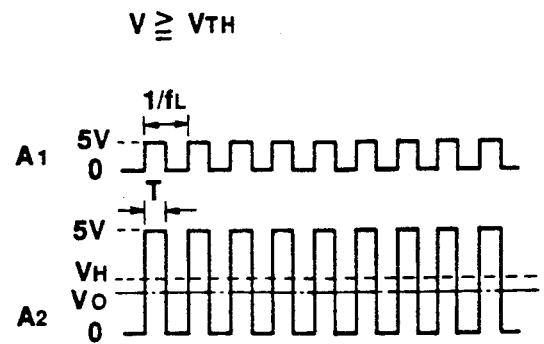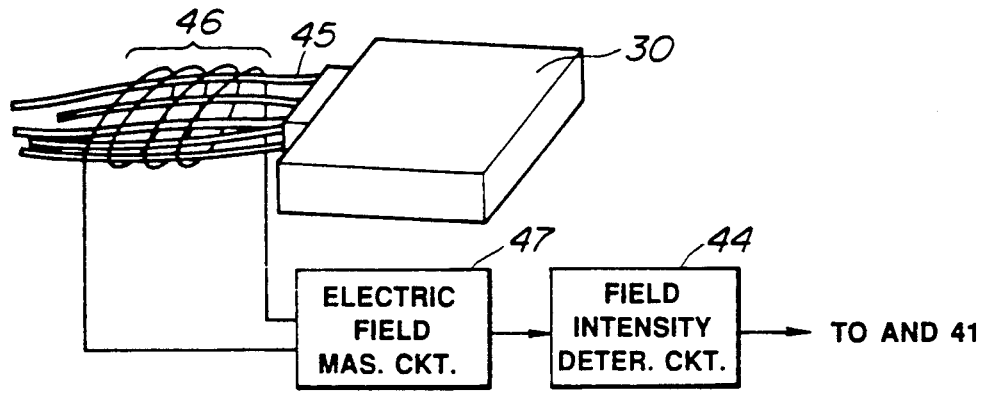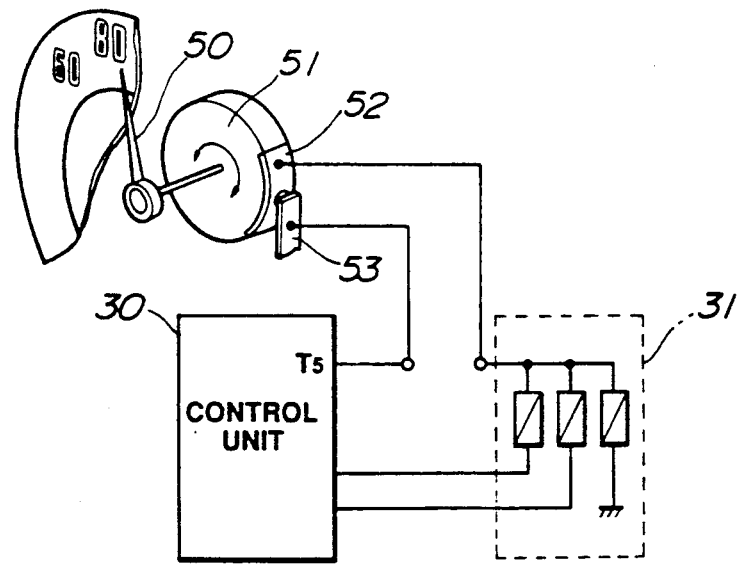

SYSTEM AND METHOD FOR AUTOMATICALLY CONTROLLING A VEHICLE SPEED TO A DESIRED CRUISE SPEED WITH A RELEASE FUNCTION

BACKGROUND OF THE INVENTION (1) Field of the invention

The present invention relates generally to a system and method for automatically controlling a vehicle speed to a desired cruise speed applicable to a vehicle.

(2) Background of the art

Recently, automatic vehicle speed controlling systems have been installed in vehicles by means of which the vehicles automatically run at desired cruising speeds (so called ASCD (Automatic Speed Control Devices).

In such vehicles, operators (drivers) accelerate the vehicles to reach speeds at which the drivers desire the vehicles to cruise. When the vehicles attain the desired speeds, the drivers recognize that the vehicles run at the desired cruising speeds through speedometers and the drivers set the vehicle speeds through set buttons. At this time, the systems adjust opening angles of throttle valves or carburetors so that the actual vehicle speeds coincide with the set vehicle speeds.

One such automatic vehicle speed controlling systems as described above is exemplified by A Japanese Patent Application First Publication (Tokkai) sho 59-58134 published on Apr. 3, 1984.

When such vehicle speed controlling systems are installed in the vehicles, it is convenient for the driver since no depression on an accelerator pedal is needed to cruise the vehicle during run on a freeway.

Furthermore, the automatic speed controlling function described above is released when the driver actuates a clutch pedal or brake pedal. In addition, when the accelerator pedal is depressed, the vehicle speed can exceed the set cruising speed. When the accelerator pedal depression is halted, the vehicle can again run at the set cruise speed after the speed reduction caused by an engine brake.

A microcomputer is installed which controls a throttle valve actuator according to a vehicle speed difference between the actual vehicle speed and set vehicle speed in the above-described vehicle speed controlling system. An opening angle of a throttle valve is adjusted through the actuation of the throttle actuator. Controlling means constituted by the microcomputer inhibits a power supply to the throttle actuator when the actual vehicle speed is a vehicle speed inappropriate for the cruising speed (for example, 45 Km/h or below) since it is uncontrollable speed.

However, the controlling means described above often erroneously detects the vehicle speed which is below the lowest controllable speed as the controllable vehicle speed so as to inappropriately control over the throttle actuator is resulted.

SUMMARY OF THE INVENTION

It is therefore an object of the present invention to provide a system and method for automatically controlling a vehicle speed to a desired cruising speed in which when the vehicle speed is below a predetermined value, the function of the automatic speed controlling can positively be released.

According to one aspect of the present invention, means for determining the vehicle speed is provided in addition to controlling means for controlling an actuator actuating a throttle valve of a vehicular engine so that the vehicle speed coincides with a target vehicle speed at which the vehicle cruises. Therefore, when the vehicle speed determining means determines that the vehicle speed is below a predetermined value, the power supply to the actuator is interrupted.

The above-described object can be achieved by providing a system for automatically controlling a vehicle speed to a desired cruise speed, comprising: (a) first means for detecting the vehicle speed and outputting a signal indicative thereof., (b) second means through which the current vehicle speed is set as the cruise speed; (c) third means responsive to the set through the second means for receiving the vehicle speed signal from the first means and for actuating an engine speed adjusting mechanism installed in a vehicular engine so that the vehicle speed coincides with the set cruise speed; (d) fourth means for determining whether the vehicle speed detected by the first means exceeds a lowest speed limit value above which the third means becomes effective; and (e) fifth means for interrupting the cruise control carried out by means of the third means on the basis of the result of determination by the fourth means.

The above-described object can also be achieved by providing a system for automatically controlling a vehicle speed to a desired cruise speed, comprising: (a) first means for detecting the vehicle speed and outputting a signal indicative thereof; (b) second means through which the current vehicle speed is set as the cruise speed; (c) third means responsive to the set through the second means for receiving the vehicle speed signal and for actuating en engine speed adjusting mechanism installed in a vehicular engine so that the vehicle speed coincides with the set cruise speed; (d) fourth means for determining whether the vehicle speed detected by the first means falls in an effective operation range of the third means, (e) fifth means for determining whether an electric field around a periphery of the third means falls in the effective operation range of the third means; and (f) sixth means for interrupting the cruise control through the engine speed adjusting mechanism by means of the third means on the basis of the result of determination at least one of the fourth and fifth means.

The above-described object can also be achieved by providing a method for automatically controlling a vehicle speed to a desired cruise speed, comprising the steps of: (a) detecting the vehicle speed and outputting a signal indicative thereof; (b) providing a set switch through which the vehicle speed is set as the cruise speed and setting the switch; (c) controlling a variable of an engine speed adjusting mechanism installed in a vehicular engine so that the vehicle speed coincides with the set cruise speed; (d) determining whether the vehicle speed exceeds a lowest speed limit above which the cruise control carried out in the step (c) becomes effective., and (e) cancelling the cruise control carried out in the step (c) on the basis of the result of the determination carried out in the step (d).

BRIEF DESCRIPTION OF THE DRAWINGS

FIGS. 2 and 3 are signal waveform charts of a vehicle speed determining circuit shown in FIG. 1 (B).

FIG. 4 is a schematic circuit block diagram of an electric field detecting apparatus.

FIG. 5 is a schematic connection diagram of another preferred embodiment according to the present invention.

DETAILED DESCRIPTION OF THE PREFERRED EMBODIMENTS

Reference will hereinafter be made to the drawings in order to facilitate understanding of the present invention.

Figure 1:
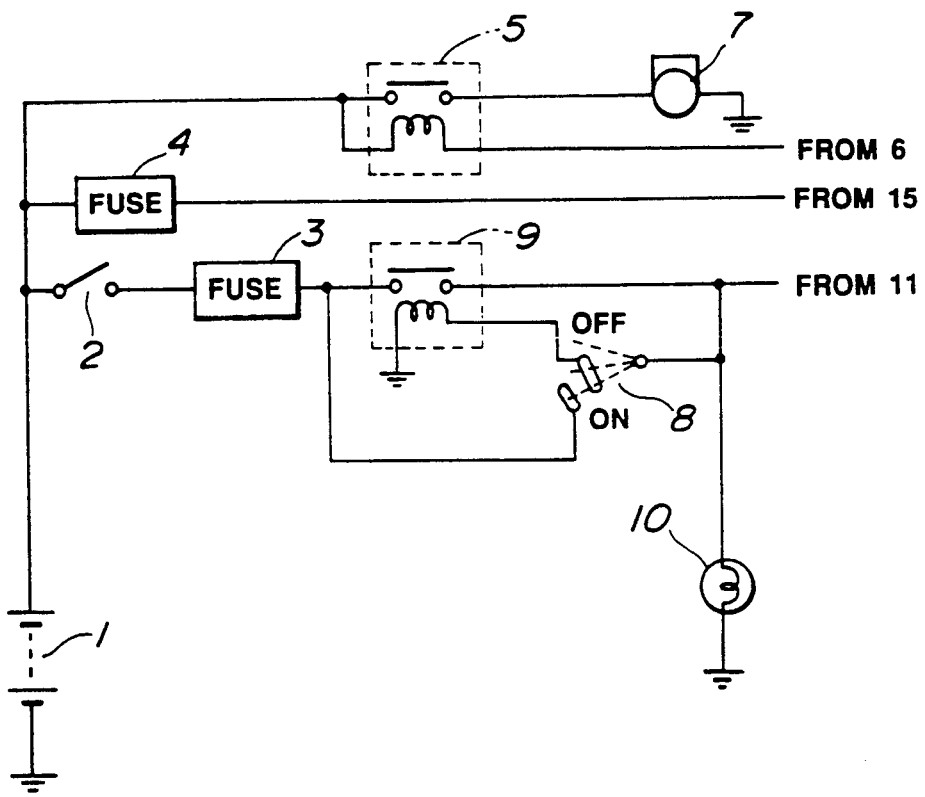
FIGS. 1 (A) and 1 (B) are integrally a schematic circuit wiring diagram of a system for automatically controlling a vehicle speed to a desired cruising speed in a preferred embodiment according to the present invention.
Figure 1:
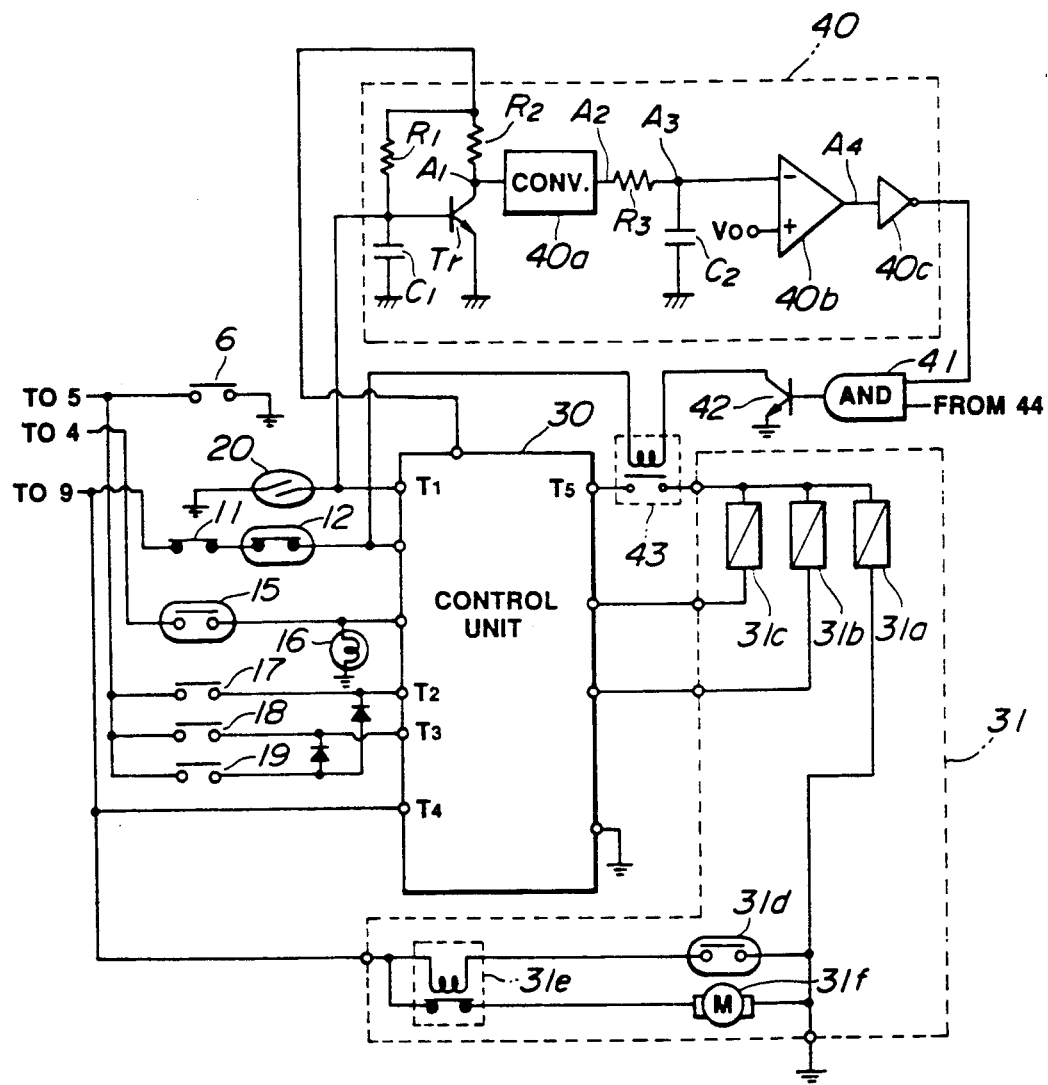

FIG. 1 is an electrical circuit of a system for automatically controlling a vehicle speed to a desired cruise speed according to the present invention.

In FIG. 1, a DC power supply (battery) denoted by 1 is connected between a horn 7 and ground. A switch 2 called an ignition switch is connected between a positive pole of the battery 1 and a fuse 3. A horn relay 5 connected to a horn switch 6 is connected between the positive pole of the battery 1 and horn 7. When the horn switch 6 is turned on, the horn 7 is sounded. Numeral 8 denotes a cruising main switch which can be placed in an ON position or in an OFF position. Numeral 9 denotes a cruise relay connected in series with the ignition switch 2 via the fuse 3. The main switch 8 is a self-holding switch which is self-held by means of the cruising relay 9 and is installed on a part of an instrument panel (not shown ). Numeral 10 denotes a main lamp which illuminates when the main switch 8 is turned on.

A normally closed clutch switch 11 is connected to the self-holding relay 9 and is open when a clutch of a vehicular transmission is depressed and a normally closed brake switch 12 is connected to the clutch switch 11 and is open when a brake pedal is depressed. These clutch and brake switches are connected to an input terminal $T_1$ of a control unit 30. It is noted that a cut relay and inhibitor switch are connected in series in pace of the brake and clutch switches 11 and 12 in the case of an equipment of an automatic transmission on the vehicle.

Furthermore, a stop lamp 16 which illuminates when a stop lamp switch 15 is turned on upon a depression of the brake pedal.

A set/coast switch 17 which is turned on when the vehicle speed is set as the cruising speed and the set vehicle speed is reduced during the cruising run is connected to an input terminal $T_2$ of the control unit 30. Numeral 19 denotes a cancel switch which is turned on when the driver has an intention to release forcibly the cruising mode therethrough. It is noted that these switches are installed on a part of a steering wheel. One contact of each switch 17, 18, and 19 is connected to either of the input terminals $T_2$ and $T_3$ of the control unit 30. Numeral 20 denotes a vehicle speed sensor outputting the vehicle speed signal and which is connected to the control unit 30.

The control unit 30 includes a microcomputer which receives on and off signals from the various switches, discriminates various conditions on the basis of such on and off signals, and controls an actuator 31, enclosed within a dotted line, for actuating a throttle valve provided in the vehicular engine.

The actuator 31 is of a positive pressure type adjusting an opening angle of the throttle valve using a compressed air, comprising a release valve 31a for discharging the compressed air from a compressed air tank to the atmosphere, an air valve 31b for opening the compressed air to the atmosphere, and an air supply valve 31c for supplying the compressed air. A throttle wire connected to a diaphragm actuated by these valves causes control for the opening angle of the throttle valve. A tank for reserving the compressed air is installed as a drive source of the actuator 31. A pressure switch 31d is installed in the tank which is turned on when the compressed air pressure exceeds a constant value. When the pressure switch 31d is turned on, a motor relay 31e is energized so that its normally closed contact is open so as to interrupt the power supply to a motor 31f. Thus, the operation of the compressor is halted, thus halting the increase in the compressed air tank. In this way, the air pressure in the compressed air tank is held constant.

The construction of the automatic vehicle speed controlling system is exemplified by U.S. patent application Ser. No. 169,218 filed on Mar. 16, 1988, patent application Ser. No. 130,473 filed on Dec. 9, 1987, and patent application Ser. No. 146,558 filed on Jan. 21, 1988, the disclosures of which are hereby incorporated by reference.

A vehicle speed determining circuit 40 is connected to the vehicle speed sensor 20. The vehicle speed determining circuit 40 is installed independently of the control unit 30. An output signal of the vehicle speed determining circuit 40 is supplied to an AND circuit 41. A transistor 42 with its bias circuit (not shown) is connected to an output end of the AND circuit 41. A relay having a normally open contact 43 is connected between an input terminal $T_5$ of the control unit 30 and actuator 31. The relay 43 supplies the power to the actuator 31 when the transistor 42 is conducted and a magnet portion thereof is energized.

The detailed construction of the vehicle speed determining circuit 40 will be described below.

A base of a transistor $T_r$ is connected with a resistor $R_1$ and a capacitor $C_1$ for eliminating noise and the output end of the vehicle speed sensor 20 to receive an analog quantity indicating the vehicle speed information. A collector of the transistor $T_r$ is connected to a constant voltage (e.g., dc 5 volts) supply circuit (not shown) provided in the control unit 30 via a resistor $R_2$. A pulse signal $A_1$ having a rectangular shape and a period corresponding to the vehicle speed is supplied to a monostable multivibrator 40a. The pulse signal $A_1$ is generated in response to an intermittent signal derived from the vehicle speed sensor 20 by means of the transistor $T_r$. The monostable multivibrator 40a is connected to an inverting input terminal of a comparator 40b via a resistor $R_3$ and a capacitor $C_2$. The multivibrator 40a produces a rectangular pulse signal $A_2$ having a pulsewidth of T as shown in FIGS. 2 and 3 in accordance with the input signal $A_1$ at each rising edge of the input signal $A_1$.

The pulse signal $A_2$ is smoothed by means of the resistor R and the capacitor $C_2$ so that an average voltage signal $A_3$ of the pulse train signal $A_2$ is supplied to the inverting input terminal of the comparator 40b.

In a case when the vehicle speed V is below a predetermined speed $V_{TH}$ (for example, 45 Km/h), a value $V_L$ of the voltage signal $A_3$ will be described with reference to FIG. 2.

The value $V_L$ is expressed as follows.

$$V_L = 5 \times T \times f_L.$$

, wherein $f_L$ denotes an inverted number of the pulse period of the pulse signal $A_1$, i.e., the frequency of the pulse signal $A_1$ when the vehicle speed V is below the predetermined vehicle speed $V_{TH}$.

Similarly, when the vehicle speed V is above the predetermined vehicle speed $V_{TH}$, the value $V_H$ of the voltage signal $A_3$ is expressed below.

$$V_H = 5 \times T \times f_H.$$

wherein $f_H$ denotes the inverted number of the pulse signal period, i.e., the frequency of the pulse signal $A_1$ when the vehicle speed V is above the predetermined speed $V_{TH}$.

Since the frequency of the pulse signal $A_1$ becomes large as the vehicle speed increases, the value of the voltage signal $A_3$ becomes reduced. As the vehicle speed increases, the value of the voltage signal $A_3$ is also increased. It is noted that the value of the predetermined speed $V_{TH}$ is set with the speed below which the cruising speed is not appropriate take into consideration.

In addition, a non-inverting input terminal of the comparator receives a reference voltage signal $V_o$. The value of the reference voltage signal $V_o$ is set as follows.

$$V_L < V_o < V_H$$

In the above inequalities, $V_L$ denotes the value of the voltage signal $A_3$ when the vehicle cruises at a low speed and $V_H$ denotes the other value of the voltage signal $A_3$ when the vehicle cruises at a high speed.

Therefore, when the value of the voltage signal $A_3$ is below the reference voltage signal $V_o$, the comparator 40b outputs a high level signal $A_4$. When the value of the voltage signal exceeds the reference voltage signal $V_o$, the comparator 40b outputs a low level signal $A_4$. The output signal of the comparator 40b is supplied to an inverter 40c and the one input terminal of the AND circuit 41. Hence, the low level signal is supplied to the AND circuit 41 when the vehicle speed is low and the high level signal is supplied to the AND circuit 41 when the vehicle speed is high.

An output signal of an electric field intensity determining circuit 44 shown in FIG. 4 is supplied to the other input terminal of the AND circuit 41. Although a protective circuit against a strong electric field intensity is provided adjacent to the control unit 30 against a strong electric field intensity, the control unit 30 may often erroneously operate if the control unit is exposed to a strong electric field exceeding a dielectric strength of the protective circuit. Therefore, the electric field intensity determining circuit 47 measures an induced voltage of a loop coil 46 wound around a harness 45 extended about a connector part of the control unit as shown in FIG. 4. The measured voltage value is determined whether it is above a predetermined voltage value by means of an electric field intensity determining circuit 44. If the measured voltage value is above the predetermined value (strong electric field), the L level signal is supplied to the AND circuit 41. If the measured voltage value is below the predetermined volt value, the H level signal is supplied to the AND circuit 41.

Consequently, if both output signals of the vehicle speed determining circuit 40 and electric field intensity determining circuit 44 are at the H level, the AND circuit 41 outputs the H level signal so that the transistor 42 is conducted and the relay 43 is turned on to supply the power to the actuator 31.

Next, the operation of the preferred embodiment shown in FIGS. 1 to 4 will be described below.

First, when the main switch 8 is turned on with the ignition switch 2 turned on, the cruising relay 9 is energized and is held in the ON position so that the main lamp 10 is illuminated. Then the input terminals $T_1$ and $T_4$ of the control unit receive the power supply voltage from the battery 1.

The operation of the preferred embodiment in a case when the vehicle runs as a low speed, i.e., the vehicle speed V is below the predetermined speed $V_{TH}$ will be described below.

During such a low speed as described above, the power supply is not supplied to the output terminal $T_5$ due to an issue of an instruction from the microcomputer of the control unit 30. Consequently, the actuator 31 is not operated.

That is to say, although not shown in the drawings, the input terminal $T_1$ of the control unit 30 is connected to the output terminal $T_5$ via a normally open contact of a relay, a coil thereof receiving the power supply by means of a switching transistor conducted upon receipt of an ON signal from the microcomputer. However, when the actual vehicle speed calculated on the basis of the signal derived from the vehicle speed sensor 20 is below $V_{TH}$, the microcomputer does not output to the above-described switching transistor so that the input terminal $T_1$ is not connected to the output terminal $T_5$.

However, even if the control unit 30 erroneously detects the vehicle speed so that the input terminal $T_1$ is connected to the output terminal $T_5$, the power supply to the actuator 31 cannot be carried out since the relay 43 remains off. In details, When the vehicle speed determining circuit 40 calculates the vehicle speed V on the basis of the vehicle speed indicative signal from the vehicle speed sensor 20 in terms of an analog quantity and determines that the calculated vehicle speed is below the predetermined vehicle speed $V_{TH}$, the L level signal is outputted to the AND circuit 41, thus the output signal of the AND circuit 41 indicating the L level. Thus, the transistor 42 is not conducted so that the relay 43 remains off.

Next, when the vehicle speed V is above the predetermined vehicle speed $V_{TH}$, the microcomputer issues the instruction so that the input terminal $T_1$ is connected to the output terminal $T_5$ The vehicle speed determining circuit 40, at the same time, outputs the H level signal to the AND circuit 41. If the electric field intensity is below the predetermined value, the electric field intensity determining circuit 44 outputs the H level signal. Thus, the AND circuit 41 outputs the H level signal so that the transistor 42 is conducted so that the relay 43 is turned on to supply the power to the actuator 31. It is noted that when the electric field intensity determining circuit 44 determines the electric field intensity and outputs the L level signal, the power supply to the actuator 31 is interrupted.

After the relay 43 is turned on and the vehicle speed reaches a desired vehicle speed, the driver can freely depress the set/cruise switch 17. When the set/cruise switch 17 is depressed, the control unit 30 stores the set vehicle speed and compares the actual vehicle speed signal outputted from the vehicle speed sensor with the set vehicle speed. Then, the control unit 30 controls according to, e.g., the difference therebetween the open and close of the release valve 31a, the air valve 31b, and supply valve 31c. That is to say, when the vehicle speed is above the set vehicle speed, the control unit 30 closes the release valve 31a, opens the air valve 31b, and closes the supply valve 31c, thus the throttle valve being directed toward the close position. When the vehicle speed is below the set vehicle speed, the control unit 30 closes the release valve 31a, the air valve 31b, and opens the supply valve 31c, the throttle valve being thus directed toward the open position. In this way, the opening angle of the throttle valve is adjusted so that the engine revolution is controlled so that the vehicle speed settles the set vehicle speed.

During the cruise control described above, the driver depresses the clutch pedal or brake pedal. At this time, the clutch switch 11 or brake switch 12 is open so that the supply of the power to the input terminal $T_1$ of the control unit 30 is interrupted so that the actuator 31 receives no power supply. Thus, the cruise control is also interrupted. The same interruption of the cruise control is carried out by the turn off of the cruise main switch 8.

On the other hand, a cancel switch 19 is provided which is turned on so that the input terminals $T_2$ and $T_3$ receive simultaneously the power supply voltage, thus stopping the vehicle speed control operation.

During the cruise control, if the driver continues to depress the accelerator switch 18 to increase the set vehicle speed and the vehicle speed reaches the new desired vehicle speed, the driver releases the switch 18. At this time, the vehicle speed is set to the new desired vehicle speed. If the driver continues to depress the set/cruise switch 17 to decrease set vehicle speed during the cruise control, the vehicle speed is decreased due to the engine braking. When the vehicle speed reaches the new desired vehicle speed, the driver releases the set/cruise switch 17 so that the vehicle speed is settled to the new set vehicle speed.

Although in the above-described preferred embodiment the analog vehicle speed determining circuit 40 is used as the vehicle speed determining means, such a switch as shown in FIG. 5 may be utilized.

In details, the switch including a movable contact having a constant length and which is extended on a part of a peripheral edge of an insulating disc plate 51 rotating with a pointer 50 of a speedometer and a fixed contact 53 fixed on a speedometer side surface is connected between the output terminal $T_5$ of the control unit 30 and the actuator 31. When the vehicle stops or the vehicle speed is below the predetermined vehicle speed, the movable contact 52 is not contacted with the fixed contact 53 so that no power supply is received by the actuator 31. However, when the vehicle speed increases, the insulating disc plate 51 rotates in a clockwise direction as viewed from FIG. 5. When the vehicle speed exceeds the predetermined value (for example, 45 Km/h), the movable contact 52 is contacted with the fixed contact 53 so that the actuator 31 receives the power supply. In this way, when the vehicle speed is below the predetermined value, the contacts 52, 53 do not contact with each other so that the power supply to the actuator 31 is interrupted.

As described hereinabove, since in the automatic vehicle speed controlling system and method according to the present invention the vehicle speed determining means is provided in addition to the controlling means for the actuator, the vehicle speed determining means causes the interruption of the power supply to the actuator upon the determination that the vehicle speed is below the predetermined vehicle speed (lower limit speed). Consequently, when the vehicle speed is below the predetermined speed, the cruising control operation can more positively be interrupted without failure.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for automatically controlling a vehicle speed to a desired cruise speed, comprising:
    (a) first means for detecting the vehicle speed and outputting a signal indicative thereof;
    (b) second means through which the current vehicle speed is set as the cruise speed;
    (c) third means responsive to the cruise speed set through the second means for receiving the vehicle speed signal and for actuating an engine speed adjusting mechanism installed in a vehicular engine so that the vehicle speed coincides with the set cruise speed;
    (d) fourth means for determining whether the vehicle speed detected by the first means falls in an effective operation range of the third means;
    (e) fifth means for determining whether an electric field around a periphery of the third means falls in the effective operation range of the third means; and
    (f) sixth means for interrupting the cruise control through the engine speed adjusting mechanism by means of the third means on the basis of the result of determination at least one of the fourth and fifth means, wherein:
    the fourth means determines whether the vehicle speed detected by the first means is above a predetermined valve, the predetermined value being a lowest vehicle speed above which the vehicle speed is controllable by the first means;
    the sixth means interrupts the cruise control by means of the third means when the fourth means determines that the vehicle speed detected by the first means is below the predetermined value;
    the third means comprises a control unit and a throttle actuator linked to an engine throttle valve, the throttle actuator having electromagnetic valves through which air pressure in a diaphragm is adjusted to control an opening angle of the throttle valve independently of an accelerator;
    the sixth means interrupts a power supply to the electromagnetic valves;
    the fourth means comprises a monostable multivibrator circuit which receives the signal from the first means and outputs a pulse signal having a predetermined pulsewidth and a frequency corresponding to the vehicle speed;
    a smoother for smoothing the pulse signal from the monostable multivibrator circuit;
    a comparator for comparing the smoothed signal from the smoother with a reference signal, the reference signal being set to a voltage corresponding to the lowest vehicle speed limit, and outputting a high (H) level signal when the smoothed signal is below the reference signal; and
    an inverter connected to the comparator.

2. A system as set forth in claim 1, wherein the sixth means comprises an AND circuit connected to the inverter and a relay circuit which turns on to connect the power supply to the throttle actuator upon receipt of the high (H) level signal from the AND circuit.

3. A system as set forth in claim 2, wherein the fifth means comprises a coil wound around the control unit; and electric field intensity measuring circuit for measuring an electric field intensity of the periphery of the control unit using the coil; and an electric field intensity determining circuit for determining whether the electric field intensity exceeds a predetermined value and outputting a low (L) level signal to the AND circuit when the electric field intensity exceeds the predetermined intensity.

4. A system as set forth in claim 1, wherein the fourth means comprises a switch including a movable contact having a constant length defining the speed range in which the cruise control by means of the third means becomes effective and extended on a part of a peripheral edge of an insulating disc plate rotating with a pointer of a speedometer and a fixed contact extended on a speedometer side surface, the switch being connected to an output terminal of the control unit and the throttle valve actuator, the switch being turned on to supply the power to the throttle actuator with the movable contact contacted with the fixed contact when the vehicle speed indicated by the speedometer exceeds the lowest limit speed.

5. A method for automatically controlling a vehicle speed to a desired cruise speed, comprising the steps of:
   (a) detecting the vehicle speed and outputting a signal indicative thereof;
   (b) providing a set switch through which the current vehicle speed is set as the cruise speed and setting the switch;
   (c) in response to setting of the switch, receiving the signal indicative of vehicle speed and actuating an engine speed adjusting mechanism installed in a vehicular engine so that the vehicle speed coincides with the set cruise speed;
   (d) independently of said step of actuating an engine speed adjusting mechanism, determining the vehicle speed from the signal indicative thereof and comparing the vehicle speed with a lowest speed limit value above which said step of actuating the engine speed adjusting mechanism becomes effective to determine whether the vehicle speed exceeds the lowest speed limit value; and
   (e) interrupting the cruise control carried out in the step (c) when the step (d) determines that the current vehicle speed is below the lowest limit value.

6. A system for automatically controlling a vehicle speed to a desired cruise speed, comprising:
   (a) first means for detecting the vehicle speed and outputting a signal indicative thereof;
   (b) second means through which the current vehicle speed is set as the cruise speed;
   (c) third means responsive to the set through the second means for receiving the vehicle speed signal from the first means and for actuating an engine speed adjusting mechanism installed in a vehicular engine so that the vehicle speed coincides with the set cruise speed;
   (d) fourth means for determining whether the vehicle speed detected by the first means exceeds a lowest speed limit value above which the third means becomes effective, and
   (e) fifth means for interrupting the cruise control carried out by means of the third means on the basis of the result of determination by the fourth means, wherein said third means includes means for outputting an actuating signal for actuating the engine speed adjusting mechanism when the vehicle speed exceeds said lowest speed limit value above which the third means becomes effective, and
   said fifth means includes interrupting means for interrupting said actuating signal if the vehicle speed does not exceed said lowest speed limit value above which the third means becomes effective,
   whereby said fifth means assures positive interruption of said speed adjusting mechanism at speeds below said lowest speed limit value even when said outputting means erroneously outputs said actuating signal for a vehicle speed below said lowest speed limit value.

7. A system for automatically controlling a vehicle speed to a desired cruise speed, comprising:
   first means for detecting the vehicle speed and outputting a signal indicative thereof;
   second means through which the current vehicle speed is set as the cruise speed at which the vehicle cruises:
   third means responsive to the speed set through the second means for receiving the vehicle speed signal from the first means and for actuating an engine speed adjusting mechanism installed in a vehicular engine so that the vehicle speed coincides with the set cruise speed;
   fourth means, operating independently of the third means, for determining the vehicle speed from the output signal of the first means and comparing the vehicle speed with a lowest speed limit value above which the third means becomes effective to determine whether the vehicle speed exceeds the lowest speed limit value; and
   fifth means for interrupting the cruise control carried out by means of the third means when the fourth means determines that the current vehicle speed is below the lowest limit value.

* * * * *